Patented Nov. 8, 1949

2,487,448

UNITED STATES PATENT OFFICE 2,487,448

POLYVINYL ALCOHOL-STARCH-CLAY ADHESIVES, PROCESSES, AND PRODUCTS

Richard W. Kingerley, Jr., Lakewood, Ohio, assignor to E. I. du Pont de Nemours & Company, Wilmington, Del., a corporation of Delaware No Drawing. Application March 1, 1944,
Serial No. 524,635

20 Claims. (Cl. 154—138)

This invention relates to compositions comprising polyvinyl alcohol, starch and clay, to processes for producing such compositions, and to processes and articles employing such compositions as adhesives. It is more particularly directed to dry compositions comprising, by weight, from 15 to 25 parts of unswollen starch, from 15 to 25 parts of polyvinyl alcohol, and from 50 to 70 parts of clay, the total parts of the named constituents being 100; is further directed to liquid adhesives produced by heating such polyvinyl alcohol-starch-clay compositions in water until the starch has been swollen and the polyvinyl alcohol dissolved; to the heating processes so employed; to processes in which two or more cellulosic plies are adhesively united with such polyvinyl alcohol-starch-clay adhesives; and to the water-resistant multi-ply structures so produced.

It has already been proposed to use polyvinyl alcohol solutions in various adhesives. For many purposes, such as in the assembling of corrugated or solid fiberboard, polyvinyl alcohol alone sets too slowly to be of important commercial value, and the adhesive films obtained are so lacking in water resistance that the utility of structures joined with the films is severely restricted. Various methods have been proposed for improving the water resistance, but most of these methods require the use of agents which add unduly to the cost of the adhesive or heat treatments which complicate and increase the cost of operations employing the adhesive. Also, the addition agents heretofore suggested tend to make polyvinyl alcohol adhesive solutions unstable and to alter their physical properties and make them less desirable for use in the manufacture of laminated fiberboard, where the physical properties of the adhesive are critical in the operation of the commercial pasting machines.

Starch adhesives have heretofore been characterized by a lack of water resistance and their use has accordingly been greatly restricted. It has been necessary to adopt such expedients as the incorporation of substantial amounts of urea formaldehyde resins in order to impart substantial water resistance to starch adhesives. Unfortunately, such resin additions give an unstable product.

The employment of dilute polyvinyl alcohol solutions as adhesives gives rise to special problems and it has been proposed to add relatively small amounts of unswollen starch to dilute polyvinyl alcohol solutions in order to accelerate the rate of set on laminated board machines. The ratio of starch to solid polyvinyl alcohol employed for this purpose is in no case as low as 1:1 by weight. It is possible to improve the water resistance of starch adhesives by adding polyvinyl alcohol, but this improvement has not heretofore been of an order of magnitude such as to result in a water-resistant fiberboard acceptable to the trade.

Now, according to the present invention, it has been found that if a dry composition comprising, by weight, from 15 to 25 parts of unswollen starch, from 15 to 25 parts of polyvinyl alcohol, and from 50 to 70 parts of clay, the total parts of the named constituents being 100, is heated in water until the starch has been swollen, there is produced a liquid adhesive which, when used to unite adhesively two or more cellulosic plies, gives a multi-ply structure having remarkable water resistance.

The polyvinyl alcohol referred to in the present description is substantially a polymer of vinyl alcohol having the recurring structure

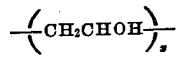

although some vinyl ester groups may also be interpolymerized with the vinyl alcohol groups. It is customarily produced by hydrolysis of polyvinyl esters, such as polyvinyl acetate, and there is normally present a minor proportion of unhydrolyzed polyvinyl ester. The amount of vinyl ester residues present should not exceed about 5 per cent, and it is greatly preferred to use a polyvinyl alcohol containing not greater than 1 per cent of vinyl ester residues, such as for instance, may be produced by at least 99 per cent complete hydrolysis of polyvinyl acetate.

It is preferred that the polyvinyl alcohol employed should be of the high viscosity type; that is, an 8 per cent solution at 78° F. should have a viscosity of more than about 200 centipoises. Ordinarily, a type giving a solution having a viscosity of between 400 and 1000 centipoises under these conditions will give excellent results, but types giving higher viscosities may also be used provided the concentration in the liquid adhesive is not so great as to cause gelling. It is particularly preferred to use a type having a viscosity of from 600 to 800 as an 8 per cent solution at 78° F.

The starch employed may be a relatively pure product or it may be any starchy material, such as flour, made from wheat, rye, and other grains. Cornstarch is relatively inexpensive and gives excellent results. Tapioca starch, sweet potato starch, and rice starch are typical of other starches which may be used to advantage.

The clay used in the adhesive should be predominantly nonbentonitic. It is preferred to use a clay which is reactive with polyvinyl alcohol; that is, a clay which acts with the polyvinyl alcohol to give a water-resistant product when an aqueous dispersion of the clay and alcohol is dried down.

The clay should also be nonalkaline, that is, when dispersed in water it should give a pH of less than 7, and preferably in the range from 4.0 to 6.0. Nonalkaline clays containing about from 26% to 40% of combined alumina ($Al_2O_3$) and having an $SiO_2:Al_2O_3$ weight ratio of about from 1.0 to 2.5 have been found to give excellent results.

The average particle size of the clay should be small enough to form a smooth, homogeneous mixture with water. Extreme fineness of particles is desirable in that it facilitates dispersion of the clay in water and gives the lowest settling rate, but inasmuch as agitation is ordinarily provided in machines employing adhesives, this advantage is of minor importance.

It is particularly preferred to use a clay having physical and chemical characteristics substantially identical with those of a South Carolina cretaceous sedimentary kaolin having the following characteristics:

| Chemical Analysis | | Particle Size | |
|---|---|---|---|
| Ingredients [1] | Per cent | Micron Diameter | Per cent |
| Combined water | 13.71 | Above 10 | 0.3 |
| Silica | 45.28 | 5–10 | 4.2 |
| Alumina | 37.15 | 4– 5 | 1.9 |
| Iron oxide | 0.84 | 3– 4 | 2.8 |
| Titanium oxide | 0.75 | 2– 3 | 3.9 |
| Sodium oxide | 0.45 | 1– 2 | 6.9 |
| Potassium oxide | 0.25 | 0.5– 1 | 10.5 |
| Phosphorus pentoxide | 1.57 | 0– 0.5 | 69.5 |
| pH=4.7 | | | |

[1] Present in combined form, calculated as indicated.

In addition to the polyvinyl alcohol, starch, and clay it is preferred to include in the compositions of this invention an effective small amount of a preservative, that is, an agent which prevents the growth of fungi or bacteria in starch. Any preservative which is compatible with the adhesive and does not alter its physical characteristics may be used. Among the effective agents are pentachlorophenol, dodecyl dimethyl benzyl ammonium chloride, zinc or iron-dimethyldithiocarbamate, tetramethylthiuram disulfide, salicylanilide, phenylmercury oleate, phenol, and cresols. The amount of such an agent used advantageously may be from 0.01 to 2.0% by weight in the dry adhesive.

The compositions of this invention may also advantageously contain a substantially insoluble alkaline material capable of acting as an acid accepter. In the use of the compositions acidity is often present in the paperboard to be joined and the alkaline material neutralizes this acidity and insures that the compositions will not be deleteriously affected by such acid. The selection of an insoluble alkaline material will offer no difficulty to those skilled in the art. Among the materials which are substantially insoluble and are alkaline are calcium carbonate, aluminum oxide, barium carbonate, calcium silicate, magnesium oxide, magnesium hydroxide, magnesium carbonate, and zinc carbonate.

The proportions of polyvinyl alcohol, starch, and clay are important in the compositions of the present invention. On the dry basis, before the starch is swollen, the proportions should fall within the limits, by weight, of from 15 to 25 parts of polyvinyl alcohol, 15 to 25 parts starch, and 50 to 70 parts clay, the total parts of the named constituents being 100, and it is particularly preferred to use 20 parts of polyvinyl alcohol, 20 parts of starch, and 60 parts clay.

In preparing a liquid adhesive from a dry composition, such as above described, the composition is stirred in water and heated until the starch swells and the polyvinyl alcohol dissolves. Such swelling is accompanied by a substantial increase in the viscosity of the mixture. The proportion of water employed preferably should be such as will give a viscosity of from 700 to 2500 centipoises, and it is especially preferred to obtain a viscosity of about 1500 centipoises at 78° F. To achieve the latter viscosity, about 78 parts of water, by weight, should be used for 22 parts of a mixture of 20% polyvinyl alcohol, 20% cornstarch and 60% clay.

An adhesive as thus prepared may be employed for uniting cellulosic plies such as paper by applying a film of the adhesive to one of the plies, superimposing another ply, and applying pressure with or without heat. It is preferred when using the adhesive in this manner to prepare and apply the adhesive to the plies as one continuous operation, rather than to prepare the liquid adhesive separately and hold it in storage for a substantial time.

The laminated structure produced by joining cellulosic plies with an adhesive according to this invention is characterized by its remarkable resistance to water. For instance, laminated paperboard boxes made with the novel adhesives may be submerged in water for prolonged periods without substantial loss of strength at the adhesive bond.

The nature of this invention will more readily be understood by reference to the following illustrative example.

*Example*

An adhesive composition in dry form was made up by mixing, in the indicated parts by weight: 60 parts South Carolina cretaceous sedimentary kaolin clay, 20 parts cornstarch, powdered, and 20 parts polyvinyl alcohol, viscosity 700 centipoises at 78° F. in 8% aqueous solution.

A liquid adhesive was made from the dry mixture as follows:

| | Pounds |
|---|---|
| Water | 4450 |
| Dry adhesive | 1250 |

Twelve hundred fifty pounds of the dry mixture was added to 4000 pounds of water with continuous agitation and then stirred until a homogeneous, lump-free slurry was obtained. The mixture was then heated to about 180° F. and maintained at this temperature for one hour by the use of live steam, 450 pounds of condensation water being thus added. The liquid adhesive was then cooled to about 110° F. and used directly for laminating paper to form solid fiberboard on a pasting machine by the customary procedure used in the art, consisting of applying a film of the adhesive to each side of two jute paperboard fillers, joining the fillers, and bonding a kraft-asphalt duplex liner to each side of the combined fillers.

The board was well bonded as taken from the machine at a rate of 200 feet per minute. The adhesive consumption was 3.5 pounds (dry basis) per 1000 square feet of board produced. Samples of the board were submerged in water at room temperature for 24 hours, then examined, and found to have no tendency to open up at the adhesive joint—that is, the strength of the adhesive bond exceeded the strength of the paper liner. After further soaking for 3 weeks, the fiberboard still showed no ply separation.

While in the foregoing description there have been shown certain specific compositions, processes, and products, it will be understood that without departing from the spirit of this invention, one skilled in the art may employ various compositions and processes and produce various products.

I claim:

1. A dry composition comprising a mixture containing, by weight, from 15 to 25 parts of unswollen starch, from 15 to 25 parts of polyvinyl alcohol, and from 50 to 70 parts of kaolinitic, nonalkaline clay, the total parts of the named constituents being 100.

2. A dry composition comprising a mixture containing, by weight, from 15 to 25 parts of unswollen starch, from 15 to 25 parts of polyvinyl alcohol of a type having a viscosity of between 400 and 1000 centipoises, measured as an 8 per cent solution at 78° F., and from 50 to 70 parts of kaolinitic, nonalkaline clay, the total parts of the named constituents being 100.

3. A dry composition comprising a mixture containing, by weight, 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100.

4. A dry composition comprising a mixture containing, by weight, 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100, and from 0.01 to 2.0 per cent by weight of preservative, based on the dry weight of the named constituents.

5. A liquid adhesive comprising an aqueous dispersion of swollen starch, polyvinyl alcohol, and kaolinitic, nonalkaline clay, the proportions of starch, on the dry, unswollen basis, and of polyvinyl alcohol, and clay, on the dry basis, being from 15 to 25 parts of starch, from 15 to 25 parts of polyvinyl alcohol, and from 50 to 70 parts of clay, the total parts of the named constituents being 100, and the proportion of water being such that the viscosity of the liquid adhesive is from 700 to 2500 centipoises at 78° F.

6. A liquid adhesive comprising an aqueous dispersion of swollen starch, polyvinyl alcohol, and kaolinitic, nonalkaline clay, the proportions of starch, on the dry, unswollen basis, and of polyvinyl alcohol, and clay, on the dry basis, being from 15 to 25 parts of starch, from 15 to 25 parts of polyvinyl alcohol of a type having a viscosity of between 400 and 1000 centipoises, measured as an 8 per cent solution at 78° F., and from 50 to 70 parts of clay, the total parts of the named constituents being 100, and the proportion of water being such that the viscosity of the liquid adhesive is from 700 to 2500 centipoises at 78° F.

7. A liquid adhesive comprising an aqueous dispersion of swollen starch, polyvinyl alcohol, and kaolinitic, nonalkaline clay, the proportions of starch, on the dry, unswollen basis, and of polyvinyl alcohol, and clay, on the dry basis, being 20 parts of starch, 20 parts of polyvinyl alcohol of a type having a viscosity of between 600 and 800 centipoises, measured as an 8 per cent solution at 78° F., and 60 parts of clay, the total parts of the named constituents being 100, and the proportion of water being such that the viscosity of the liquid adhesive is 1500 centipoises at 78° F.

8. A liquid adhesive comprising an aqueous dispersion of swollen starch, polyvinyl alcohol, kaolinitic, nonalkaline clay, and a perservative, the proportions of starch, on the dry, unswollen basis, and of polyvinyl alcohol, and clay, on the dry basis, being 20 parts of starch, 20 parts of polyvinyl alcohol, and 60 parts of clay, the total parts of the named constituents being 100, the proportion of water being such that the viscosity of the liquid adhesive is 1500 centipoises at 78° F., and the preservative being present in an amount from 0.01 to 2.0 per cent, by weight, of the total dry weight of the named constituents.

9. In a process for producing a liquid adhesive, the steps comprising dispersing and heating in water a mixture comprising, by weight, from 15 to 25 parts of unswollen starch, from 15 to 25 parts of polyvinyl alcohol, and from 50 to 70 parts of kaolinitic, nonalkaline clay, the total parts of the named constituents being 100.

10. In a process for producing a liquid adhesive, the steps comprising dispersing and heating in water a mixture comprising, by weight, from 15 to 25 parts of unswollen starch, from 15 to 25 parts of polyvinyl alcohol of a type having a viscosity of between 40 and 1000 centipoises, measured as an 8 per cent solution at 78° F., and from 50 to 70 parts of kaolinitic, nonalkaline clay, the total parts of the named constituents being 100.

11. In a process for producing a liquid adhesive, the steps comprising dispersing and heating in water a mixture comprising, by weight, 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100.

12. In a process for producing a liquid adhesive, the steps comprising dispersing and heating in water a mixture comprising, by weight, 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100, and from 0.01 to 2.0 per cent by weight of a preservative, based on the dry weight of the named constituents.

13. In a process for producing a multi-ply structure, the steps comprising dispersing and heating in water a mixture comprising, by weight, from 15 to 25 parts of unswollen starch, from 15 to 25 parts of polyvinyl alcohol, and from 50 to 70 parts of kaolinitic, nonalkaline clay, the total parts of the named constituents being 100, applying to a cellulosic ply a film of the liquid adhesive so produced, and superimposing another ply upon the film.

14. In a process for producing a multi-ply structure, the steps comprising dispersing and heating in water a mixture comprising, by weight, from 15 to 25 parts of unswollen starch, from 15 to 25 parts of polyvinyl alcohol of a type having a viscosity of between 400 and 1000 centipoises, measured as an 8 per cent solution at 78° F., and from 50 to 70 parts of kaolinitic, nonalkaline clay, the total parts of the named constituents being 100, applying to a cellulosic ply a film of the liquid adhesive so produced, and superimposing another ply upon the film.

15. In a process for producing a multi-ply structure, the steps comprising dispersing and heating in water a mixture comprising, by weight, about 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100, applying to a cellulosic ply a film of the liquid adhesive so produced, and superimposing another ply upon the film.

16. In a process for producing a multi-ply structure, the steps comprising dispersing and heating in water a mixture comprising, by weight, about 20 parts of unswollen starch, 20 parts of polyvinyl alcohol of a type having a viscosity of between 600 and 800 centipoises, measured as an 8 per cent solution at 78° F., and 60 parts of kaolinitic, nonalkaline clay, the total parts of the named constituents being 100, and about from 0.01 to 2.0 per cent of a preservative, applying to a cellulosic ply a film of the liquid adhesive so produced, and superimposing another ply upon the film.

17. A multi-ply structure comprising a plurality of cellulosic plies united with an adhesive comprising the product resulting from the drying down, in situ, of an aqueous dispersion of swollen starch, polyvinyl alcohol, and kaolinitic, nonalkaline clay, the proportions of starch, on the dry, unswollen basis, and of polyvinyl alcohol, and clay, on the dry basis, being from 15 to 25 parts of starch, from 15 to 25 parts of polyvinyl alcohol, and from 50 to 70 parts of clay, the total parts of the named constituents being 100, and the proportion of water being such that the viscosity of the liquid adhesive is about from 800 to 2500 centipoises at 78° F.

18. A multi-ply structure comprising a plurality of cellulosic plies united with an adhesive comprising the product resulting from the drying down, in situ, of an aqueous dispersion of swollen starch, polyvinyl alcohol, and kaolinitic, nonalkaline clay, the proportions of starch, on the dry, unswollen basis, and of polyvinyl alcohol, and clay, on the dry basis, being from 15 to 25 parts of starch, from 15 to 25 parts of polyvinyl alcohol of a type having a viscosity of between 400 and 1000 centipoises, measured as an 8 per cent solution at 78° F., and from 50 to 70 parts of clay, the total parts of the named constituents being 100, and the proportion of water being such that the viscosity of the liquid adhesive is about from 700 to 2500 centipoises at 780° F.

19. A multi-ply structure comprising a plurality of cellulosic plies united with an adhesive comprising the product resulting from the drying down, in situ, of an aqueous dispersion of swollen starch, polyvinyl alcohol, and kaolinitic, nonalkaline clay, the proportions of starch, on the dry, unswollen basis, and of polyvinyl alcohol, and clay, on the dry basis, being 20 parts of starch, 20 parts of polyvinyl alcohol of a type having a viscosity of between 600 and 800 centipoises, measured as an 8 per cent solution at 78° F., and 60 parts of clay, the total parts of the named constituents being 100, and the proportion of water being such that the viscosity of the liquid adhesive is about 1500 centipoises at 78° F.

20. A multi-ply structure comprising a plurality of cellulosic plies united with an adhesive comprising the product resulting from the drying down, in situ, of an aqueous dispersion of swollen starch, polyvinyl alcohol, kaolinitic, nonalkaline clay, and a preservative, the proportions of starch, on the dry, unswollen basis, and of polyvinyl alcohol, and clay, on the dry basis, being 20 parts of starch, 20 parts of polyvinyl alcohol, and 60 parts of clay, the total parts of the named constituents being 100, the proportion of water being such that the viscosity of the liquid adhesive is about 1500 centipoises at 78° F., and the preservative being present in an amount from 0.01 to 2.0 per cent, by weight, of the total dry solids.

RICHARD W. KINGERLEY, Jr.

REFERENCES CITED

The following references are of record in the file of this patent:

UNITED STATES PATENTS

| Number | Name | Date |
| --- | --- | --- |
| 2,250,681 | Schwartz | July 29, 1941 |
| 2,256,853 | Schwartz | Sept. 23, 1941 |
| 2,333,023 | Manor | Oct. 26, 1943 |
| 2,343,898 | Griffin | Mar. 14, 1944 |

Certificate of Correction

Patent No. 2,487,448 November 8, 1949

RICHARD W. KINGERLEY, Jr.

It is hereby certified that errors appear in the printed specification of the above numbered patent requiring correction as follows:

Column 6, line 12, for "perservative" read *preservative*; line 35, for the numeral "40" read *400*; column 8, line 9, for "780° F." read *78° F.*;

and that the said Letters Patent should be read with these corrections therein that the same may conform to the record of the case in the Patent Office.

Signed and sealed this 11th day of April, A. D. 1950.

[SEAL]

THOMAS F. MURPHY,
*Assistant Commissioner of Patents.*